US010166480B2

(12) United States Patent
Tsuchiya et al.

(10) Patent No.: US 10,166,480 B2
(45) Date of Patent: Jan. 1, 2019

(54) INFORMATION PROCESSING APPARATUS

(71) Applicant: Sony Computer Entertainment Inc., Tokyo (JP)

(72) Inventors: Akitsugu Tsuchiya, Kanagawa (JP); Shigeru Enomoto, Kanagawa (JP); Nobukazu Koyama, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 855 days.

(21) Appl. No.: 14/417,614

(22) PCT Filed: Jul. 18, 2013

(86) PCT No.: PCT/JP2013/004387
§ 371 (c)(1),
(2) Date: Jan. 27, 2015

(87) PCT Pub. No.: WO2014/024386
PCT Pub. Date: Feb. 13, 2014

(65) Prior Publication Data
US 2015/0209676 A1 Jul. 30, 2015

(30) Foreign Application Priority Data

Aug. 10, 2012 (JP) .................................. 2012-178266
Aug. 10, 2012 (JP) .................................. 2012-178267

(51) Int. Cl.
*A63F 13/70* (2014.01)
*A63F 13/79* (2014.01)
(Continued)

(52) U.S. Cl.
CPC .............. *A63F 13/79* (2014.09); *A63F 13/71* (2014.09); *A63F 13/75* (2014.09); *G06F 21/31* (2013.01);
(Continued)

(58) Field of Classification Search
CPC ...... H04N 21/4532; A63F 13/70; A63F 13/71
(Continued)

(56) References Cited

U.S. PATENT DOCUMENTS 7,509,290 B1* 3/2009 McKee ................. H04L 63/083
705/50
7,729,000 B2 6/2010 Shudo
(Continued)

FOREIGN PATENT DOCUMENTS

CN 101107612 A 1/2008
EP 1862203 A1 12/2007
(Continued)

OTHER PUBLICATIONS

Czarcasmo, "Disable display of logged in user on screensaver unlock", https://www.centos.org/forums/viewtopic.php?t=2675.*
(Continued)

*Primary Examiner* — Omkar Deodhar
*Assistant Examiner* — Ross Williams
(74) *Attorney, Agent, or Firm* — Matthew B. Dernier, Esq.

(57) ABSTRACT

When a communication unit receives a connection request from a device, a selection screen generating unit provides a selection screen for selecting a registered user. A login user storage unit separately stores information identifying a primary user who logged in first and information identifying one or more secondary users who logged in second or thereafter. Specifically, the login user storage unit stores the information identifying the primary user in association with information indicating initial login. An application startup unit starts an application upon receipt of a start instruction from the device used by the primary user but does not start the application when given the start instruction from the device used by the secondary user.

14 Claims, 9 Drawing Sheets

(51) Int. Cl.
*G06F 21/31* (2013.01)
*G06F 21/34* (2013.01)
*H04L 29/06* (2006.01)
*A63F 13/71* (2014.01)
*A63F 13/75* (2014.01)

(52) U.S. Cl.
CPC .............. *G06F 21/34* (2013.01); *H04L 63/08* (2013.01); *H04L 63/0861* (2013.01); *H04L 63/083* (2013.01); *H04L 63/0876* (2013.01)

(58) Field of Classification Search
USPC ..................................................... 463/40–42
See application file for complete search history.

(56) References Cited

U.S. PATENT DOCUMENTS

| 7,836,192 | B2* | 11/2010 | Johnson | .................. | A63F 13/10 |
|---|---|---|---|---|---|
| | | | | | 463/29 |
| 2004/0128145 | A1 | 7/2004 | Saton | | |
| 2004/0168092 | A1 | 8/2004 | Adachi | | |
| 2005/0209008 | A1 | 9/2005 | Shimizu | | |
| 2007/0253013 | A1 | 11/2007 | Shudo | | |
| 2009/0205031 | A1 | 8/2009 | Sato | | |
| 2011/0092280 | A1 | 4/2011 | Koyama | | |

FOREIGN PATENT DOCUMENTS

| EP | 2286882 A1 | 2/2011 |
|---|---|---|
| JP | 2002014907 | 1/2002 |
| JP | 2004-097548 A | 4/2004 |
| JP | 2006202196 A | 8/2006 |
| JP | 2007-300441 A | 11/2007 |
| JP | 2009271771 | 11/2009 |
| JP | 2010-183358 A | 8/2010 |
| JP | 2011128907 A | 6/2011 |
| JP | 2011221739 A | 11/2011 |
| JP | 2012004832 A | 1/2012 |
| JP | 2012100185 A | 5/2012 |
| WO | 2002035414 A1 | 5/2002 |

OTHER PUBLICATIONS

"Prevent Windows 7 from going to sleep when no users are logged on.", Experts Exchange, https://www.experts-exchange.com/questions/27230519/Prevent-Windows-7-from-going-to-sleep-when-no-users-are-logged-on.html.*
"Is there a way to sign on as a guest in the Xbox dashboard'?", posted Dec. 1-Dec. 3, 2011 at https://gaming.stackexchange.com/questions/39612/is-there-a-way-to-sign-on-as-a-guest-in-the-xbox-dashboard.*
Unleashing the power of real-time collaboration: Security overview of Cisco WebEx solutions circa 2009.*
JP Office Action for corresponding JP Application No. JP 2015-094096, 12 pages, dated May 24, 2016.
European Search Report for corresponding EP Application No. EP 13827615, 7 pages, dated May 30, 2016.
International Preliminary Report on Patentability and Written Opinion for corresponding PCT Application No. PCT/JP2013/004387, 6 pages, dated Feb. 12, 2015.
Office Action for corresponding CN Application No. 201380041278.7, 17 Pages, dated Jul. 28, 2016.
International Search Report for corresponding PCT Application No. PCT/JP2013/004387, dated Aug. 13, 2013.
Yoshinari Kosei, Game Creation! Oh! X, 2000.04.0, pp. 54-75, (2000 spring).

* cited by examiner

DO YOU HAVE A NETWORK ACCOUNT?

○ YES, I DO.

× NO, I DON'T.

4

(b)

ASSOCIATE THE NETWORK ACCOUNT WITH A LOCAL ACCOUNT.

SIGN-IN ID
(E-MAIL ADDRESS)

PASSWORD

4

(c)

WILL YOU SET A KEY COMBINATION TO PROTECT YOUR LOGIN?

○ YES, I WILL.

× NO, NOT NOW.

4

FIG. 6
(a)
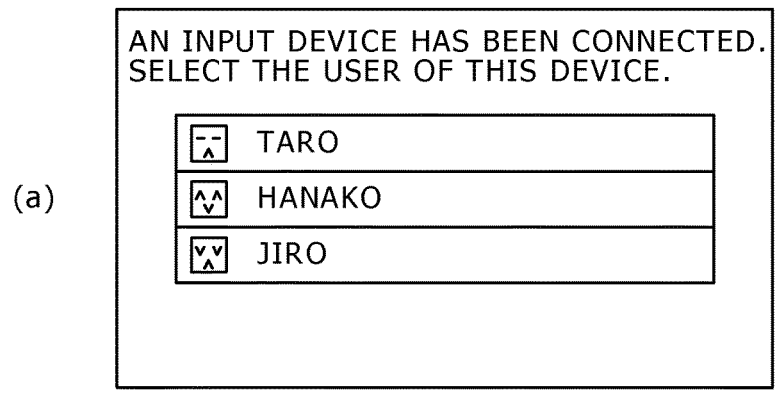
(b)
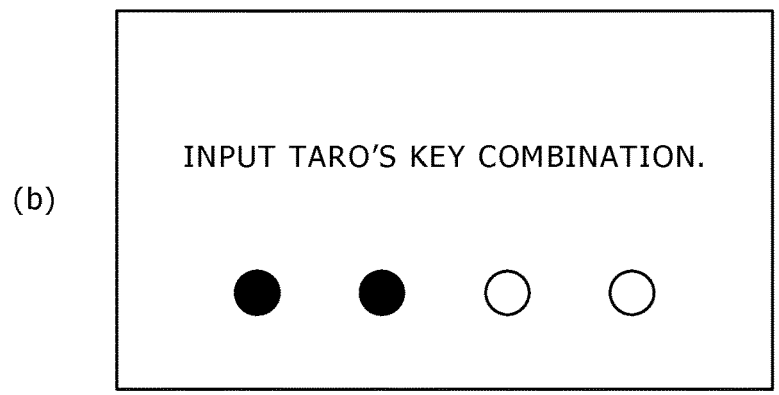
(c)

(a)
AN INPUT DEVICE HAS BEEN CONNECTED. SELECT THE USER OF THIS DEVICE.

HANAKO
JIRO

LOG IN AS A GUEST USER —140

4

(b)
INPUT HANAKO'S KEY COMBINATION.

WILL YOU USE YOUR NETWORK ACCOUNT?

○ YES, I WILL.

× NO, I WON'T.

4

(b)

SELECT HOW TO SIGN IN.

INPUT SIGN-IN ID AND PASSWORD

USE 2-D BARCODE

4

(c)

GUEST A HAS LOGGED IN.

BECAUSE AN ACCOUNT HAS YET TO BE CREATED, DATA CANNOT BE SAVED AND TROPHIES CANNOT BE OBTAINED. IF YOU WANT TO SAVE DATA IN MAIN BODY, CREATE A LOCAL ACCOUNT.

4

INFORMATION PROCESSING APPARATUS

TECHNICAL FIELD

The present invention relates to an information processing apparatus such as a game machine.

BACKGROUND ART

There has been proposed a system which, when a user has achieved a mission set in a video game, grants the user a trophy as a virtual prize for the mission accomplished (see PTL 1). The trophies won by the user on the game machine are also registered in a server connected to a network so that trophy acquisition information is synchronized between the game machine and the server.

CITATION LIST

Patent Literature

[PTL 1] US 2011/0092280 A1

SUMMARY

Technical Problem

With the game machine described in the above-cited PTL 1, only one user can log into the operating system (OS) of the game machine. Also, only the user who has logged into the OS can sign into the server. Thus, even where multiple users are playing the game, those other than the login user cannot win any trophy, which leaves room for improvement.

On the other hand, if multiple users are allowed to log into the OS of the game machine, the game involved may grant each user a trophy at the cost of very complicated user management to be performed by the game. It has thus been desired to provide arrangements that would reduce the burden on those developing video games. From the user's standpoint, it is inconvenient to register his or her information whenever logging into, say, a friend's game machine at the latter's place. Given the inconvenience, it has also been desired to devise arrangements that would allow users simply to play the video games.

The present invention has been made in view of the above circumstances and provides techniques for facilitating user management and allowing users to play video games with ease.

Solution to Problem

In solving the problem above and according to one embodiment of the present invention, there is provided an information processing apparatus including: a registered user information holding unit configured to hold user information about users registered in the information processing apparatus; a communication unit which, upon receipt of a connection request from a device, is configured to connect the device with the information processing apparatus; and a login controller which, upon receipt by the communication unit of the connection request from the device, is configured to determine whether or not to allow a user to log in through the use of the user information held in the registered user information holding unit. The login controller includes a storage unit configured to store information identifying a primary user who logged in first and information identifying one or more secondary users who logged in second or thereafter during login of the primary user. The storage unit stores the information identifying the primary user in association with information indicating initial login.

According to another embodiment of the present invention, there is provided an information processing apparatus including: a registered user information holding unit configured to hold user information about users registered in the information processing apparatus; a communication unit which, upon receipt of a connection request from a device, is configured to connect the device with the information processing apparatus; and a login controller configured to determine whether or not to allow a user to log in. The login controller includes a login authentication unit configured to allow a user to log in by identifying an account of the user through authentication by use of the user information held in the registered user information holding unit, and an account granting unit configured to grant a temporary account to the user not authenticated by the login authentication unit.

Incidentally, if other combinations of the above-outlined composing elements or the above expressions of the present invention are converted between different forms such as a method, a device, a system, a recording medium, and a computer program, they still constitute effective embodiments of this invention.

BRIEF DESCRIPTION OF DRAWINGS

FIG. 4 (*a*) through (*c*) are illustrations showing examples of displayed screens.

FIG. 6 (*a*) through (*c*) are illustrations showing other examples of the displayed screens.

FIG. 8 (*a*) through (*c*) are illustrations showing other examples of the displayed screens.

DESCRIPTION OF EMBODIMENT

Figure 1:
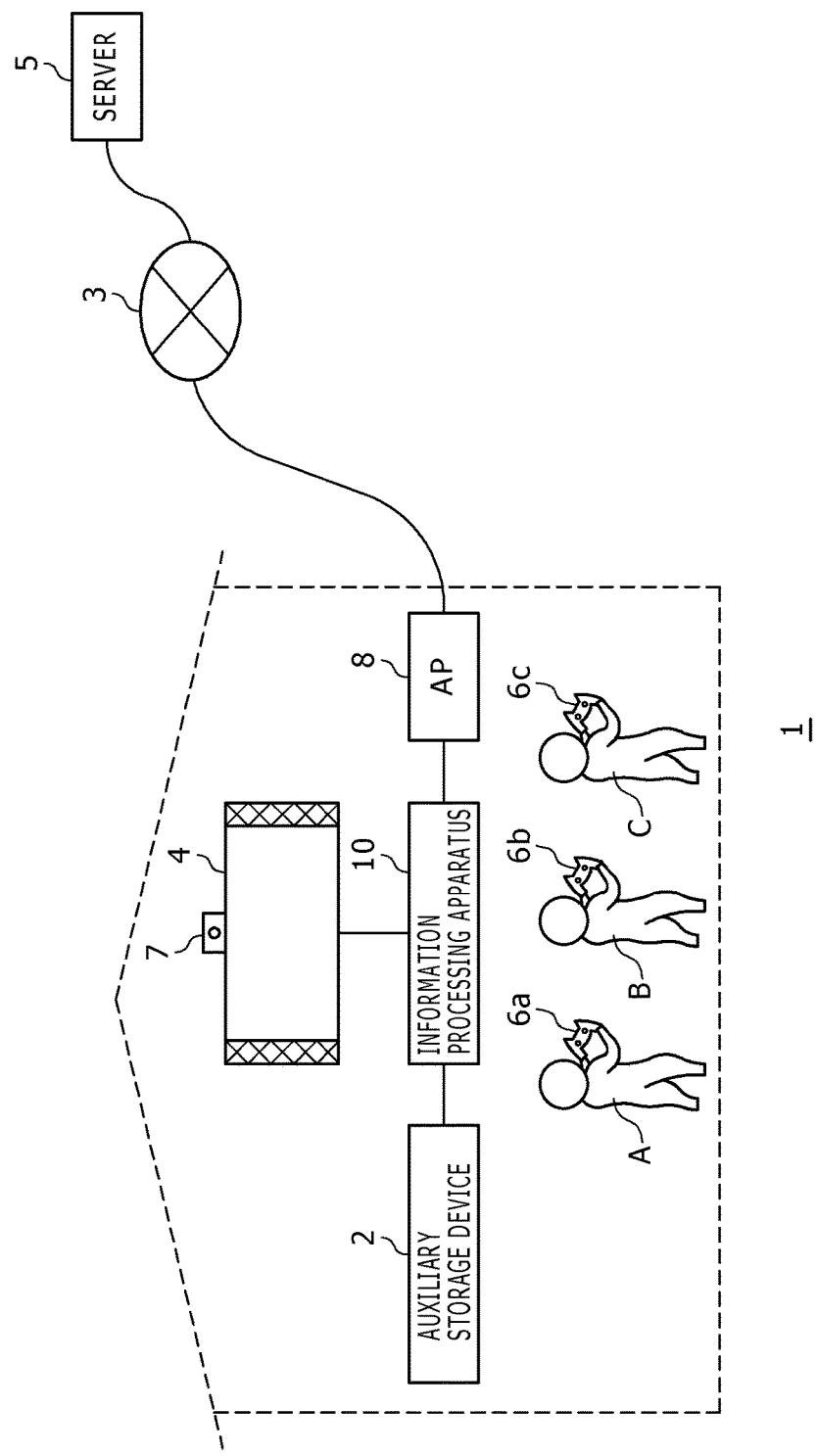
FIG. 1 is a diagram showing an information processing system as an embodiment of the present invention.

FIG. 1 shows an information processing system 1 as one embodiment of the present invention. The information processing system 1 includes an information processing apparatus 10 as a user terminal, and a server 5. An auxiliary storage device 2 is a mass storage device such as an HDD (hard disk drive) or a flash memory. Alternatively, the auxiliary storage device 2 may be an external storage device connected to the information processing apparatus 10 via a USB (Universal Serial Bus) port, or a built-in storage device. An output device 4 may be a TV set equipped with a display unit that displays images and speakers that output sounds. Alternatively, the output device 4 may be a computer display. The output device 4 may be connected to the information processing apparatus 10 by a cable or by a wireless LAN. The information processing apparatus 10 is connected wirelessly with an input device 6 operated by a user and receives operation signals from the input device 6. The information processing apparatus 10 has the operation signals from the input device 6 reflected in the processing of an application, and outputs the result of the processing from the output device 4. The input device 6 is configured to have multiple input units such as a number of push type operation buttons, an analog stick by which analog quantities may be input, and a rotary button. The information processing apparatus 10 may be a game machine that executes video games. The input device 6 may be a game controller. A camera 7 is installed near the output device 4 and takes images of the space around the output device 4.

An access point (called the AP hereunder) 8 has the functions of a wireless access point and a router. The information processing apparatus 10 is connected in wired or wireless fashion to the AP 8 and connected therethrough communicably to the server 5 on a network 3.

The server 5 provides network services to the users of the information processing system 1. The server 5 manages network accounts identifying the individual users. Using the network account, each user signs into a network service provided by the server 5. By signing into the network service through the information processing apparatus 10, the user can register in the server 5 the saved data from games as well as trophies acquired as virtual prizes while playing games. Also with the information processing system 1 of this embodiment, multiple users operating different information processing apparatuses 10 may take part in an online game. The server 5 may also function as a game server that manages the sessions of games.

In FIG. 1, the server 5 is represented as a server that aggregates these functions. Thus, the server 5 may be physically composed of multiple servers. Each of these servers may be maintained and managed by the entities corresponding to the respective functions.

Also in FIG. 1, three users A, B and C are shown playing a game using the same information processing apparatus 1. Each user may log into the OS of the information processing apparatus 10, store the saved data into the information processing apparatus 10, and acquire trophies as virtual prizes upon accomplishing missions during the games. When each user logs in, the OS associates the user with the device operated by that user. In this example, the OS associates an input device 6a with the user A, an input device 6b with the user B, and an input device 6c with the user C. From the standpoint of the games, each user can be identified with the information specifying the input device 6 (e.g., with a game controller ID).

Figure 2:
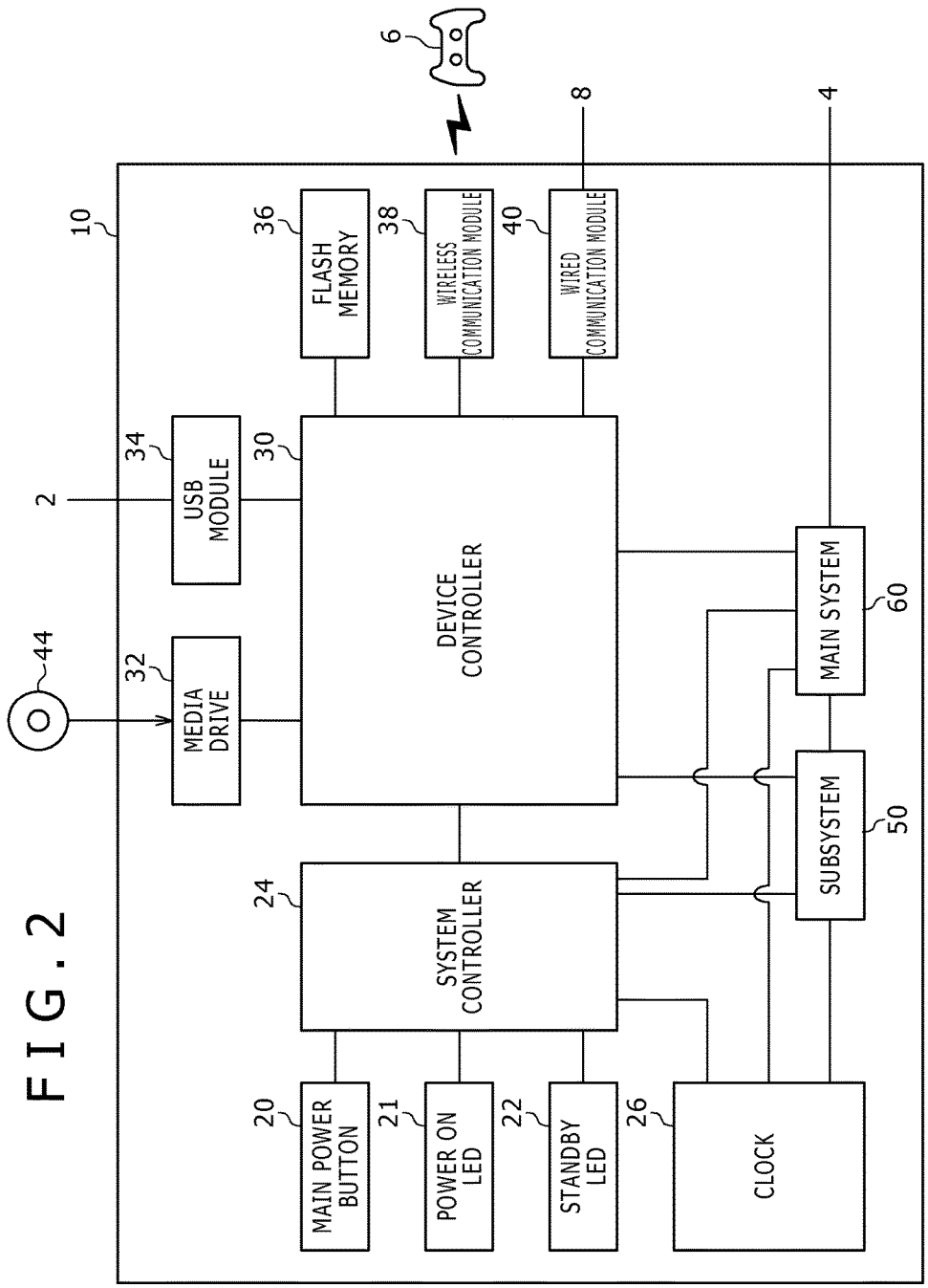
FIG. 2 is a diagram showing functional blocks of an information processing apparatus.

FIG. 2 is a functional block diagram of the information processing apparatus 10. The information processing apparatus 10 is configured to have a main power button 20, a power ON LED 21, a standby LED 22, a system controller 24, a clock 26, a device controller 30, a media drive 32, a USB module 34, a flash memory 36, a wireless communication module 38, a wired communication module 40, a subsystem 50, and a main system 60.

The main system 60 is configured to include a main CPU (Central Processing Unit), and the subsystem 50 is configured to have a sub CPU. The main CPU and the sub CPU operate in a mutually exclusive manner. That is, when the main CPU is started and in an active state, the sub CPU is in a standby state. On the other hand, when the sub CPU is started and in the active state, the main CPU is in the standby state. While the main power supply of the information processing apparatus 10 is being turned on, the main CPU performs various processes such as applications in an environment generated by the operating system (OS) while the sub CPU is in sleep mode. On the other hand, when the main power supply of the information processing apparatus is turned off, the main CPU starts the sub CPU and goes into sleep mode. In this manner, the main CPU and the sub CPU operate in a manner that is mutually exclusive.

The main power button 20 is an input unit on which the user performs an input operation. As such, the main power button 20 is installed at the front of the enclosure of the information processing apparatus 10 and is operated to turn on or off the supply of power to the main system 60 of the information processing apparatus 10. In the ensuing description, the expression "the main power supply is in the on-state" will mean that the main system 60 is in the active state, and the expression "the main power supply is in the off-state" will mean that the main system 60 is in the standby state. The power ON LED 21 is illuminated when the main power button 20 is switched on, and the standby LED 22 is illuminated when the main power button 20 is switched off.

The system controller 24 detects whether the user has pressed the main power button 20. If the main power button 20 is pressed while the main power supply is in the off-state, the system controller 24 acquires the pressing operation as an "ON instruction." On the other hand, if the main power button 20 is pressed while the main power supply is in the on-state, the system controller 24 acquires the pressing operation as an "OFF instruction." The on/off state of the main power supply can be controlled from the input device 6. If a predetermined button (called the HOME button hereunder) of the input device 6 is pressed while the main power supply is in the off-state, the system controller 24 acquires the button operation as an "ON instruction." On the other hand, if the HOME button is pressed while the main power supply is in the on-state, the system controller 24 acquires the button operation as an "OFF instruction." In the information processing apparatus 10 of this embodiment, when the main power supply is in the off-state, the subsystem 50 is in the active state; when the main power supply is in the on-state, the main system 60 is in the active state.

Upon acquiring the ON instruction, the system controller 24 notifies the subsystem 50 in the active state of the result of the detection, extinguishes the standby LED 22, and illuminates the power ON LED 21. At this point, the subsystem 50 starts the main system 60 and goes into standby mode. On the other hand, upon acquiring the OFF instruction, the system controller 24 notifies the main system 60 in the active state of the result of the detection, extinguishes the power ON LED 21, and illuminates the standby LED 22. At this point, the main system 60 starts the subsystem 50 and goes into standby mode.

The main CPU has the function of executing game programs installed in the auxiliary storage device 2, whereas the sub CPU has no such function. However, the sub CPU has the function of accessing the auxiliary storage device 2 and the function of sending and receiving information to and from the server 5. The sub CPU is configured to have only those limited processing functions, so that the sub CPU can operate with less power consumption than the main CPU.

The clock 26 is a real-time clock that generates the current date and time information and supplies the generated information to the system controller 24, subsystem 50, and main system 60.

The device controller 30 is configured as an LSI (Large-Scale Integrated Circuit) that executes exchanges of information between devices, as with a Southbridge. As illustrated, the device controller 30 is connected with such devices as the system controller 24, media drive 32, USB module 34, flash memory 36, wireless communication module 38, wired communication module 40, subsystem 50, and main system 60. The device controller 30 absorbs differences in electrical characteristics and data transfer rates between the devices and thereby controls the timing of data transfers.

The media drive 32 is a drive device that drives a loaded ROM medium 44 on which application software such as games is recorded so as to read programs and data from the ROM medium 44. The ROM medium 44 is a piece of read-only recording media such as optical disks, magneto-optical disks, and Blu-ray disks.

The USB module 34 is a module that connects to an external device by a USB cable. For example, the USB module 34 may connect to a hard disk drive serving as the auxiliary storage device 2 by a USB cable. The flash memory 36 is an auxiliary storage device that constitutes an internal storage. The wireless communication module 38 communicates wirelessly, for example, with the input device 6 by communication protocols such as Bluetooth (registered trademark) or IEEE 802.11. Incidentally, the wireless communication module 38 may also support the third-generation digital mobile phone system based on IMT-2000 (International Mobile Telecommunication 2000) established by the ITU (International Telecommunication Union). The wired communication module 40 communicates with an external device in wired fashion, connecting to the network 3 via the AP 8 for example.

The main system 60 includes the main CPU, a memory as a main storage device, a memory controller, a GPU (Graphics Processing Unit) and so forth. These functions may be provided in the form of a single system-on chip. The main CPU has the function of starting the OS and, in the environment provided by the OS, of executing applications installed in the auxiliary storage device 2.

The subsystem 50 includes the sub CPU, a memory as a main storage device, a memory controller and so forth. The GPU is not included. The number of circuit gates in the sub CPU is smaller than that in the main CPU. The sub CPU consumes less operating power than the main CPU. As mentioned above, the sub CPU is active while the main CPU is in the standby state. The sub CPU is thus limited in its processing functionality in order to minimize power consumption. The sub CPU and the memory may be formed alternatively in a separate chip or chips.

Figure 3:
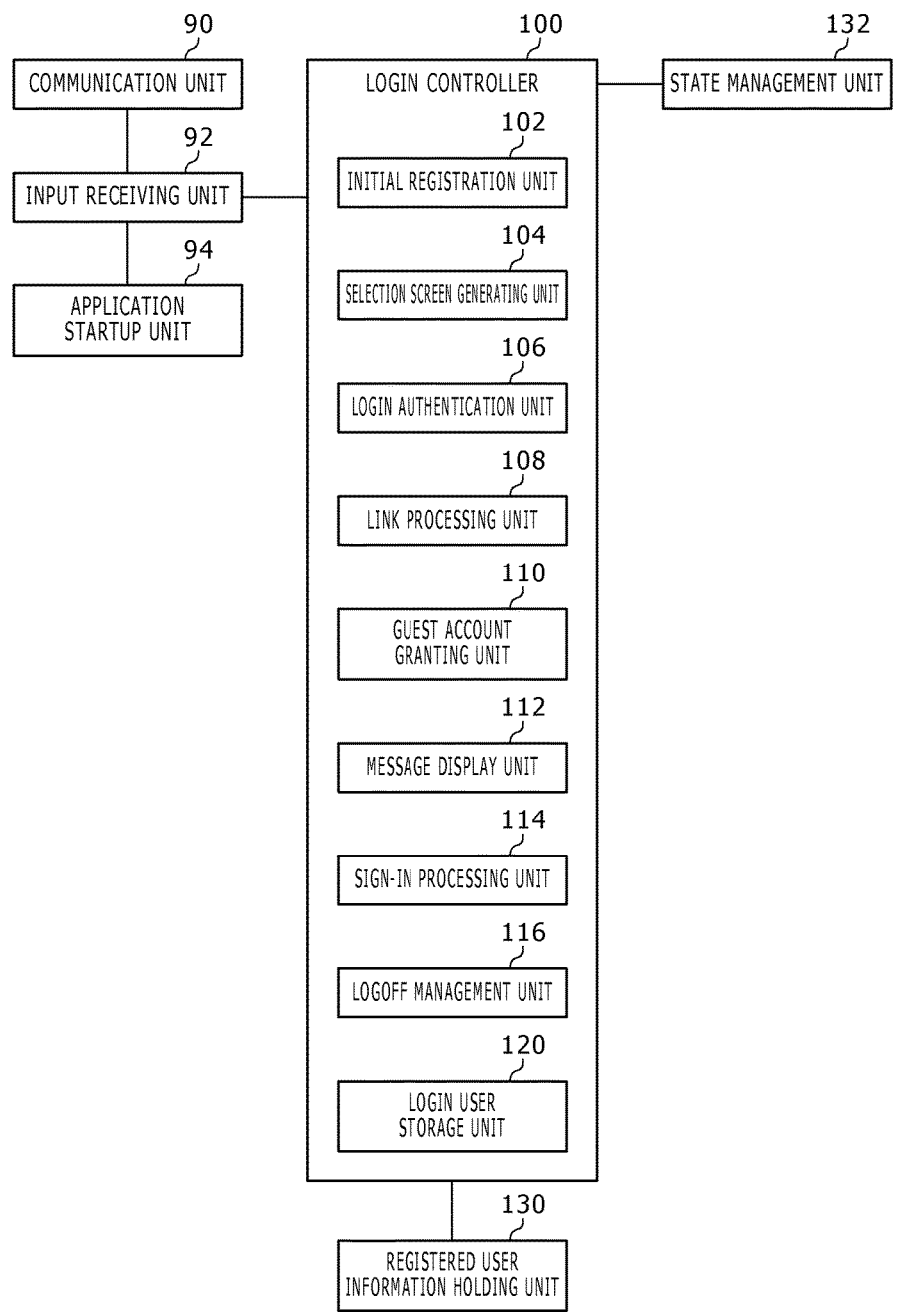
FIG. 3 is a diagram showing other functional blocks of the information processing apparatus.

FIG. 3 shows the functional blocks of the information processing apparatus 10. The information processing apparatus 10 includes a communication unit 90, an input receiving unit 92, an application startup unit 94, a login controller 100, a registered user information holding unit 130, and a state management unit 132. The login controller 100 is implemented by the OS of the information processing apparatus 10. As such, the login controller 100 includes an initial registration unit 102, a selection screen generating unit 104, a login authentication unit 106, a link processing unit 108, a guest account granting unit 110, a message display unit 112, a sign-in processing unit 114, a logoff management unit 116, and a login user storage unit 120. The communication unit 90 provides the functions of the wireless communication module 38 and wired communication module 40 shown in FIG. 2.

In FIG. 3, the components depicted as the functional blocks for carrying out various processes may be constituted by an LSI of circuit blocks, memories and the like in hardware terms, or by the programs loaded into a memory in software terms. Thus, it will be appreciated by those skilled in the art that these functional blocks can be implemented in diverse forms by hardware alone, by software alone, or by a combination of both and are not limited thereby.

One characteristic of the OS of the information processing apparatus 10 constituting this embodiment is that the OS allows multiple users to log in. Each user needs to have acquired a user account in order to log into the OS of the information processing apparatus 10. In the ensuing description, the user account for logging into the information processing apparatus 10 will be called the "local account." When using the information processing apparatus 10 for the first time, the user registers a local account in the information processing apparatus 10 by following a predetermined procedure.

Meanwhile, the accounts of the users utilizing the information processing system 1 (called the network accounts hereunder) have been registered in the server 5. The network account is linked to each user and associated with the user's online ID (a nickname on the network) or the like. Where a user used old-generation information processing apparatuses (game machines) in the past, that user is likely to already possess a network account with the information processing system 1. When a local account is to be registered, the information processing apparatus 10 associates that local account with the network account. This allows the user to store into the server 5 the trophies acquired with the information processing apparatus 10 as well as the saved data from the games played thereon.

If a user does not possess a network account, that user will sign up with the server 5 using the information processing apparatus 10. Specifically, the user will register a sign-in ID (email address) and a password in the server 5 and be granted a network account thereby.

<Registration of the Local Account>

When the user logs into the information processing apparatus 10 for the first time, the initial registration unit 102 causes the output device 4 to present on its display a user interface for registering a local account. FIGS. 4(a), 4(b), 4(c), 5(a), and 5(b) show typical guide screens displayed on the output device 4. The user performs local account registration work by operating an input unit attached to the input device 6. First, as shown in FIG. 4(a), a screen appears querying whether the user has a network account. The ensuing paragraphs will explain the local account registration work to be performed when the user already possesses a network account.

If the user presses a circle button on the input device 6 given the query screen of FIG. 4(a), an input screen shown in FIG. 4(b) is displayed. Through this input screen, the user inputs the information entered in the past to acquire the network account, i.e., a sign-in ID (email address) and a password.

When the user inputs the sign-in ID and password, the screen shown in FIG. 4(c) is displayed, querying whether the user will set a key combination. When the user presses the circle button of the input device 6 given this query screen, a key input screen shown in FIG. 5(a) is displayed. When the user presses four keys on the input device 6 at this point, the combination of these keys will be used as the password for authentication at the user's login. For example, if the input device 6 has circle, cross, triangular, and square buttons, the user may press the circle, cross, circle, and triangular buttons, in that order, and this key combination will be used for authentication at the user's login.

When the sign-in ID and password are input, the initial registration unit 102 creates a local account and grants it to the user. Also, the initial registration unit 102 connects to the server 5, notifies the server 5 of the local account, and receives from the server 5 the data associated with the network account. The data includes at least the user's online ID. The ensuing paragraphs will discuss an example in which the user A has acquired "TARO" as the online ID. The server 5 holds the local account thus notified in association with the network account.

The initial registration unit 102 stores the user's local account, key combination information, network account, sign-in ID, password, and online ID into the registered user information holding unit 130 as registered user information. Here, the local account is used by the user at login to the OS of the information processing apparatus 10. The network account is used by the user at sign-in to the server 5.

Figure 5:
FIG. 5 (*a*) and (*b*) are illustrations showing other examples of the displayed screens.

When the user has finished the work above, a state screen shown in FIG. 5(*b*) is displayed. This state screen presents the user's login state and sign-in state and is generated by the message display unit 112. It is shown here that the local account of "TARO" has been registered in the information processing apparatus 10 and that "TARO" is now online.

The foregoing paragraphs have shown the procedure followed by the user at initial login. Once the initial registration unit 102 has set the local account to the registered user information holding unit 130, there is no need for the user to repeat the work thereafter. Multiple users A, B and C have registered their local accounts in the information processing apparatus 10 of this embodiment. These users can log into the information processing apparatus 10 at the same time. It is assumed here that the user B's online ID is "HANAKO" and that the user C's online ID is "JIRO."

<Login Processing>

What follows is an explanation of how a registered user logs into the OS of the information processing apparatus 10. When the user presses a predetermined button (HOME button) of the input device 6, the pressing information is transmitted to the information processing apparatus 10. In the information processing apparatus 10, the communication unit 90 receives the pressing information as a connection request and connects to the input device 6. The pressing information from the HOME button is also sent to the input receiving unit 92. The input receiving unit 92 receives the pressing information as a login request from the user and forwards the request to the login controller 100 that determines whether or not to allow the user to log in.

The selection screen generating unit 104 reads the registered user information held in the registered user information holding unit 130 so as to generate a selection screen for selecting the user registered in the information processing apparatus 10. Specifically, the selection screen generating unit 104 reads the online ID's from the registered user information, and generates a selection screen on which the online ID's of the registered users are arranged in list form.

FIG. 6(*a*) shows a typical selection screen. The selection screen generating unit 104 reads the online ID's of all registered users held in the registered user information holding unit 130, and displays the retrieved online ID's in list form so that the user can make a choice from the list. For example, on the selection screen, a focus frame enclosing a single online ID is movably displayed. The user may operate the input unit of the input device 6*a* to move the focus frame onto a display area indicating the user's own online ID, and press a determination key of the input device 6*a* to select the online ID possessed by the user. Suppose now that the user A requests login and that the user A selects "TARO" on the selection screen by operating the input device 6*a*. In this case, the selection screen generating unit 104 generates a key combination input screen shown in FIG. 6(*b*). When the user A inputs the registered key combination, the login authentication unit 106 determines whether the input key combination coincides with the user A's key combination held in the registered user information holding unit 130, thereby determining whether or not to allow the user A to log in.

The selection screen shown in FIG. 6(*a*) includes an account setting area (not shown) for initial registration of a local account. After selecting the account setting area by operating the input device 6, the user proceeds with local account registration work in accordance with the guide screens shown in FIGS. 4 and 5. Incidentally, the account setting area on the selection screen is selected by moving the focus frame onto the account setting area as described above and by pressing the determination key of the input device 6*a*.

Alternatively, an image acquired by the camera 7 may be used to select the user on the selection screen. The registered user information holding unit 130 may store portrait photos of the registered users in advance. When the selection screen generating unit 104 displays the selection screen, the login authentication unit 106 may identify the user by performing a face authentication process based on the image acquired by the camera 7, and set the focus frame onto the ID display area of the identified user. Where the login authentication unit 160 performs the face authentication process, the user may be identified alternatively by matching the portrait photos of the registered users held in the registered user information holding unit 130 against the face image of the user included in the acquired image by the login authentication unit 160 without the selection screen being generated by the selection screen generating unit 104. The online ID of the identified user alone may then be displayed on a verification screen. The verification screen may display a verification message such as "Are you really TARO?" and an area permitting the selection of either "YES" or "NO." If the user selects "NO" at this point, the selection screen generating unit 104 may be arranged to display the selection screen. In this manner, if the face authentication process is not successfully performed, the user can still select his or her own online ID from the selection screen.

Besides the face authentication, the input device 6 may be equipped with a fingerprint sensor, and the sensor information acquired by the fingerprint sensor may be used as the basis for the login authentication unit 106 to identify the user. In this case, the registered user information holding unit 130 may hold beforehand the fingerprint information about the registered users. When the selection screen generating unit 104 displays the selection screen, the login authentication unit 106 may identify the user by performing a fingerprint authentication process based on the sensor information, and set the focus frame onto the online ID display area of the identified user. Alternatively, when the login authentication unit 106 performs the fingerprint authentication process, the login authentication unit 106 may perform matching the fingerprint information held in the registered user information holding unit 130 against the result of the detection by the fingerprint sensor without the selection screen being generated by the selection screen generating unit 104, and display only the online ID of the identified user on the verification screen. As mentioned above, the verification screen then displays the verification message such as "Are you really TARO?" and the area for selecting "YES" or "NO." If the user selects "NO," the selection screen generating unit 104 displays the selection screen.

After the user is selected by selecting the online ID on the selection screen or by identifying the user by the login authentication unit 106 using camera images or fingerprint sensor information, the user inputs the user information (key combination) for login authentication through the key combination input screen. If the input user information (key combination) corresponds to the user information (key combination) held in the registered user information holding unit 130, the login authentication unit 106 identifies the account of the user in question and allows the user to log in. As opposed to the input of a password composed of alphabetic characters or the like upon login authentication, the authentication based on the key combination is highly secure because the input keys are difficult to observe from other users. Another advantage is that the input work may be finished instantaneously. Since the user is eager to play games as soon as possible, the authentication involving the key combination also meets the user's needs.

As described above, the login authentication unit 106 identifies the user's account by performing authentication through the use of the user information held in the registered user information holding unit 130, and allows the identified user to log in. The authentication based on the key combination is optional. In particular, where face authentication or fingerprint authentication is implemented, there is no need to perform the authentication involving the key combination. Where the user who has yet to set a key combination selects the online ID from the selection screen, the authentication of the user is considered accomplished by the user selecting one of the online ID's displayed on the selection screen.

When the login authentication unit 106 permits the user A to log in, the link processing unit 108 associates the user A with the input device 6a used by the user A. This allows the OS to identify the user A as the user of the input device 6a. The OS then notifies the game or the like of the corresponding relation between the user A and the input device 6a. In turn, the game recognizes that the operation signals from the input device 6a are given by the user A, and is able to perform user management accordingly with regard to the saved data and acquired trophies.

Also, when the login authentication unit 106 permits the user A to log in, the sign-in processing unit 114 automatically lets the user A sign into the network service provided by the server 5. This automatic sign-in is carried out using the user information (network account) registered in the registered user information holding unit 130. The automatic sign-in to the network service performed when the user logs into the information processing apparatus 10 dispenses with the user's manual sign-in work.

FIG. 6(c) shows a typical message displayed after login. The message display unit 112 displays a message indicating that the user A (TARO) is currently online. If the information processing apparatus 10 is not connected to the network 3 or if the AP 8 is malfunctioning, the user A cannot sign in. In that case, a message indicative of an offline state is displayed.

The login authentication unit 106 stores login information into the login user storage unit 120. Specifically, the login authentication unit 106 stores the information identifying the user A in association with the information indicative of initial login, and also stores the information identifying the device used by the user A.

In the information processing system 1 of this embodiment, multiple users log into the information processing apparatus 10 at the same time. For this reason, user management is more complicated than when only one user is allowed to log in. Also, not only from the viewpoint of the OS but also from the viewpoint of game developers regarding user management, the management of saved data and trophies becomes complicated if the user who has started a game is different from the user who plays the game.

Thus, in the information processing apparatus 10, the user who logged in first is distinguished from one or more users who logged in second or thereafter during login of the first user. With this embodiment, the user who logs in first is called the "primary user" and the user(s) who logs in second or thereafter is called the "secondary user(s)." The paragraphs that follow will explain the case in which, with the user A having logged in as the primary user, the user B logs in as the secondary user.

When the user B presses a predetermined button (HOME button) of the input device 6b, the pressing information is transmitted to the information processing apparatus 10. In the information processing apparatus 10, the communication unit 90 receives the pressing information as a connection request and connects to the input device 6b accordingly. The pressing information from the HOME button is also sent to the input receiving unit 92. The input receiving unit 92 receives the pressing information as a login request from the user and forwards the request to the logion controller 100.

The selection screen generating unit 104 reads the users' online ID's held in the registered user information holding unit 130 to generate a selection screen for selecting the user registered in the information processing apparatus 10. At this point, the selection screen generating unit 104 does not include the currently logged-in users on the selection screen. In this example, the user A having the online ID "TARO" has already logged in, so that the selection screen generating unit 104 generates a selection screen excluding the user A from its list. This eliminates the possibility of the user B erroneously selecting the online ID of the user A.

FIG. 7(a) shows another typical selection screen. The selection screen generating unit 104 reads from the registered user information holding unit 130 the online ID's of the users who have yet to log in, and displays the retrieved online ID's in list form so that the user can make a choice from the list. Because the user B is requesting to log in at this point, the user B operates the input device 6b to select "HANAKO" on the selection screen. In turn, the selection screen generating unit 104 generates a key combination input screen shown in FIG. 7(b). When the user B inputs the previously registered key combination through this input screen, the login authentication unit 106 determines whether the input key combination coincides with the user B's key combination held in the registered user information holding unit 130, thereby determining whether or not to allow the user B to log in. Incidentally, the user may also be selected through face authentication by the login authentication unit 106 using camera images or through fingerprint authentication using the result of the detection by a fingerprint sensor.

When the login authentication unit 106 permits the user B to log in, the link processing unit 108 associates the user B with the input device 6b used by the user B. This allows the OS to identify the user B as the user of the input device 6b. The OS then notifies the game or the like of the corresponding relation between the user B and the input device 6b. In turn, the game recognizes that the operation signals from the input device 6b are given by the user B, and is able to perform user management accordingly with regard to the saved data and acquired trophies.

Also, when the login authentication unit 106 permits the user B to log in, the sign-in processing unit 114 automatically lets the user B sign into the network service provided by the server 5. This automatic sign-in is carried out using the user information (network account) registered in the registered user information holding unit 130.

The login authentication unit 106 stores the login information about the user B into the login user storage unit 120.

Specifically, the login authentication unit 106 stores the information identifying the user B in association with the information indicative of the secondary user, and also stores the information identifying the device used by the user B.

As described above, the login authentication unit 106 stores into the login user storage unit 120 the information identifying the user A having logged in first and the information identifying the user B having logged in second or thereafter, the two items of information being distinguished from each other. Specifically, the login authentication unit 106 stores into the login user storage unit 120 the information identifying the user A, along with the information indicative of initial login, i.e., information indicating that the user A is the primary user. Also, the login authentication unit 106 stores into the login user storage unit 120 the information identifying the user B, together with the information indicative of secondary or subsequent login, i.e., information indicating that the user B is the secondary user.

In the login user storage unit 120, the information about the devices used by the login users is further stored in association with the login users. In this manner, the login user storage unit 120 stores the information (local accounts) identifying the login users, the information about the devices used by the login users, and the information indicating whether a given user is the primary user, in such a manner that these items of information are associated with one another. When transmitting the operation signals from the user, the input device 6 includes the information identifying the input device 6 (device information) in transmission packets. Given the operation signals from the input device 6, the OS and the application (game) can identify the user from the device information included in the operation signals and determine whether the user in question is the primary user.

The application startup unit 94 starts applications such as games based on the operation signals from the input device 6. In this case, the application startup unit 94 starts an application upon receipt of a start instruction from the input device 6 used by the primary user but does not start any application when given the start instruction from the input device 6 used by the secondary user. That is, the information processing apparatus 10 grants the right to start an application only to the primary user, and does not permit the secondary user to start any application. Upon receipt of an application start instruction from the input device 6, the application startup unit 94 extracts the device information from the start instruction, and determines whether the user associated with the device information is the primary user by referencing what is stored in the login user storage unit 120. In this manner, the application is started for the primary user but not started for the secondary user. Also, only the primary user can issue an application termination instruction.

The state management unit 132 manages the system operating state of the information processing apparatus 10. In this context, the system operating state means whether the main power supply is in the on-state or in the off-state. Specifically, it means whether the main system 60 is in the active state or in the standby (stopped) state.

Upon receipt of a log-off request from a user, the logoff management unit 116 allows the user in question to log off. Specifically, the logoff management unit 116 identifies the user by referencing what is stored in the login user storage unit 120 based on the device information included in the logoff request, and allows the user to log off by deleting the information about the identified user from the login user storage unit 120. When the logoff management unit 116 allows the primary user to log off, the state management unit 132 sets the system operating state to the standby state. That is, when the primary user logs off, the system operating state is held in the standby state even if the secondary user is still logging in. The secondary user is caused forcibly to log off. On the other hand, when the logoff management unit 116 receives a logoff request from the secondary user and allows that user to log off, the state management unit 132 does not change the system operating state and maintains the active state. In this manner, when the primary user logs off, the information processing apparatus 10 is forcibly placed into the standby state. This makes it possible to avoid the situation where the primary user is absent. Alternatively, after the primary user has logged off, a given secondary user may be allowed to become the primary user under control of the logoff management unit 116.

The secondary user is subject to constraints such as having no right to start applications. Still, the secondary user is free to access the saved data and trophy information linked to the local accounts and/or network accounts. It is also possible for the secondary user to delete saved data.

<Handling of the Guest User>

The foregoing paragraphs have explained cases where users have been registered in the information processing apparatus 10 beforehand so that a given user selects his or her online ID from the selection screen to log in. Meanwhile, when a user is invited to a friend's place to use the latter's information processing apparatus 10, the information about the visiting user is not likely to have been registered in the information processing apparatus 10. In such a case, the information processing apparatus 10 is designed with the concept of "guest user," allowing an unregistered user to utilize the information processing apparatus 10 easily.

Figure 7:
FIG. 7 (*a*) and (*b*) are illustrations showing other examples of the displayed screens.

Referring to FIG. 7(*a*), the selection screen generating unit 104 is shown displaying a selection screen which, besides the list of registered users, includes a skip area 140 for allowing a user to skip the operation to select an online ID. For example, when a user D is to use the information processing apparatus 10, the user D is not a registered user of the information processing apparatus 10 so that the online ID of the user D is not included in the user list. As explained above in reference to FIG. 6(*a*), the selection screen shown in FIG. 7(*a*) is also provided with the account setting area (not shown) for registering a local account for the first time. Although the user D can select the account setting area and register user information and acquire a local account by following the guide screens in FIGS. 4 and 5, it takes time. Instead, the information processing apparatus 10 of this embodiment allows the user D to select the skip area 140 to skip the operation to select the online ID.

As discussed earlier, the information processing apparatus 10 does not permit its use by users not in possession of local accounts. Thus, the guest account granting unit 110 grants a temporary account to the user who has skipped the operation of user selection. The user who is granted the temporary account in this manner is called a "guest user."

The user allowed to log in through the user authentication process by the login authentication unit 106 is called a "registered user." The "guest user" is a concept opposed to the "registered user." The guest user is a user who is not performed authentication by the login authentication unit 106 and is permitted to log in when granted a temporary account. The guest user is only allowed temporarily to use the information processing apparatus 10. When a given user selects the skip area 140 and the guest account granting unit 110 grants that user a temporary account, the login authentication unit 106 authorizes the user temporarily to log in based on the temporary account. In this manner, the user D can get to use the OS of the information processing apparatus 10 without being in possession of a unique local account.

FIG. 8(*a*) shows a typical query screen displayed after the user D has selected the skip area 140. The guest user is allowed temporarily to log in by the information processing apparatus 10 and is not a registered user thereof. For this reason, the guest user cannot record the saved data or the like to the information processing apparatus 10. Still, by signing into the network service through the information processing apparatus 10, the guest user can register in the server 5 the saved data from games as well as the trophies acquired while playing games. As long as the guest user's information processing apparatus is being turned on, the guest user can use the saved data and trophy information recorded in that information processing apparatus.

The query screen shown in FIG. 8(*a*) queries whether or not the user D will use a network account. If the user presses the circle button of the input device 6, the screen shown in FIG. 8(*b*) is displayed. This screen indicates two alternative manners in which a sign-in ID and a password are to be input.

If the user D selects the alternative "Input sign-in ID and password," a screen for inputting a sign-in ID and a password such as one shown in FIG. 4(*b*) is displayed. When the user D inputs the sign-in ID and password, the sign-in processing unit 114 permits the user D to sign into the network service provided by the server 5. This allows the user D to register the saved data and acquired trophy information in the server 5 while playing games on the information processing apparatus 10 in which the local account is not registered.

On the other hand, if the user selects the alternative "Use two-dimensional (2-D) barcode," the screen is switched to a camera-acquired image. When the user D holds a 2-D code in his or her possession in front of the camera, the sign-in processing unit 114 reads information from the 2-D code. Here, the 2-D code includes at least information about the user D's sign-in ID and password; the 2-D code may also include information about the user D's local account. By analyzing the imaged 2-D code, the sign-in processing unit 114 acquires the information about the user D's sign-in ID and password and thereby authorizes the user D to sign into the network service provided by the server 5. This allows the user D to register the saved data and acquired trophy information in the server 5 while playing games on the information processing apparatus 10 in which the local account is not registered.

The 2-D code has been generated by the server 5 in response to the user D's request and provided to the user D in advance. For example, the server 5 may transmit a 2-D code image to the user D's portable terminal device such as a mobile phone. In turn, the user D may get the 2-D barcode displayed on his or her portable terminal device and hold the displayed barcode against the camera 7. Using the 2-D code to input the sign-in ID and password eliminates the user's trouble of inputting them manually.

Having signed in, the guest user can use the saved data registered in the server 5 and view the content also registered therein. In this manner, the guest user who has signed in can access the saved data and trophy information linked to the local account and/or network account via the server 5. The saved data can also be deleted. That is, by signing in, the guest user, though unable to leave saved data in the information processing apparatus 10 on which to play games, can still transmit and receive data to and from the server 5 and can thus play games in an environment similar to that of a registered user.

If the user, given the query screen shown in FIG. 8(*a*), presses the cross button of the input device 6, the message indicated in FIG. 8(*c*) is displayed. The user D cannot send or receive data to or from the server 5 without using a network account. Thus when the login authentication unit 106 permits the guest user to log in, the message display unit 112 causes the output device 4 to display a predetermined message indicating that a guest user has logged in without using a network account. The user D who does not sign in is thus notified that data cannot be saved and trophies cannot be acquired and that the functions available to the guest user are therefore limited.

The login authentication unit 106 stores into the login user storage unit 120 the information identifying the users having local accounts and the information identifying the user granted a temporary account in such a manner that the two items of information are distinguished from each other. Specifically, the login authentication unit 106 stores into the login user storage unit 120 the information identifying the user A in association with the information indicative of a registered user as well as the device information, and also stores into the login user storage unit 120 the information identifying the user D in association with the information indicative of an unregistered user (the information indicative of a guest user) as well as the device information. This allows the OS or the application (game), given the transmission of operation signals from the input device 6, to identify the user from the device information included in the operation signals and to determine whether the identified user is a registered user or a guest user.

When the guest user logs off, the logoff management unit 116 deletes the temporary account.

The skip area 140 shown in FIG. 7(*a*) is not displayed on the selection screen indicated in FIG. 6(*a*). The selection screen shown in FIG. 6(*a*) is a screen for selecting the primary user. With the information processing apparatus 10, the primary user is the only user that can start applications. Thus, the user who first logs in must always do so as the primary user. The alternative of logging in as the guest user is granted only to the user logging in second or thereafter during login of the primary user.

While the present invention has been described in conjunction with a specific embodiment given as an example, it should be understood by those skilled in the art that the above-described composing elements and various processes may be combined in diverse ways and that such combinations, variations and modifications also fall within the scope of this invention.

In reference to FIG. 7(*a*), it was explained above that the selection screen generating unit 104 excludes the users having already logged in from the list of registered users. Whereas the game controller is assumed to be the input device 6 in the present embodiment, a single user may use multiple input devices 6 depending on the games. For example, the user A can use both a game controller and a headset. Thus, the selection screen generating unit 104 references the device information included in a connection request from a device and, if the connection request is from the same device type, may exclude the users having already logged in from the registered user list. If the connection request is from a different type of device, the selection screen generating unit 104 does not exclude the users having already logged in from the registered user list. For example, if at least one game controller has already been connected and if a connection request comes from a different device type (headset), the selection screen generating unit 104, upon verifying the absence of any login user associated with the device information of the headset, reads all registered user information held in the registered user information holding unit 130 and generates a selection screen for selecting a user registered in the information processing apparatus 10. When the user is selected on the selection screen, the link processing unit 108 associates the selected user with the device information about the headset. The information processing apparatus 10 can also be controlled by voice from the headset. By identifying the headset through which voice has been input, the information processing apparatus 10 can recognize the login user associated with that headset.

In the embodiment, the link processing unit 108 associates a given user with the input device 6 used by that user. The corresponding relation between the user and the input device is stored into the login user storage unit 120. The link processing unit 108 may determine the type of the device having generated the connection request and associate the device information about that device with the user depending on the device type. For example, the game controller is an input device to be linked with a given user. As discussed above, when a given user selects his or her online ID from the selection screen, that user is linked with the game controller. However, with regard to the devices of which only a single unit can be connected, such as a mouse or a keyboard, the link processing unit 108 may automatically link that device with the primary user. In order to perform such processing, the link processing unit 108 may hold information indicating the types of devices to be connected only as a single unit each and the types of devices that may be connected in multiple units. When a device that can only be connected as a single unit is connected, the link processing unit 108 links that device with the primary user. The device type may be identified by the device information (device ID) held by each device, for example. As another example, each device may be arranged to hold the information identifying its device type (type ID), so that the link processing unit 108 may identify the device in question from that type ID. With regard to the mouse or keyboard that can only be connected as a single unit to the information processing apparatus 10, the link processing unit 108 may refrain from linking the device with any user in particular without establishing linkage with the primary user. If the link processing unit 108 either links the mouse or keyboard with a specific user (primary user) or does not link the device with any user in particular, the selection screen generating unit 104 need not generate the selection screen for user selection when the mouse or keyboard is connected.

With this embodiment, it was explained that the user is linked with the device. Alternatively, multiple users may be changed one after another when linked with a single device. For example, where a golf game is played by multiple users, the order in which the users hit their golf balls one after another are established within the game, and the users play the game by turns. Conceivably, a golf club-like game controller dedicated to the golf game may be used by all users by turns. In that case, the link processing unit 108 under instructions from the game may cause the output device 4 to display a message prompting the change of users. For example, if the users A and B are playing the game and when the user A has hit the ball, the link processing unit 108 displays the message "User B (HANAKO), it's your turn to hit the ball," and stores the correspondence between the user B and the device information into the login user storage unit 120. When the user B has hit the ball, the link processing unit 108 displays the message "User A (TARO), it's your turn to hit the ball," and stores the correspondence between the user A and the device information into the login user storage unit 120 while deleting therefrom the correspondence between the user B and the device information. Where the link processing unit 108 performs user management in this manner, a single device can be shared by multiple users.

It was assumed above that when logging in, the user operates the input device 6 to connect it directly with the information processing apparatus 10. Alternatively, the user may use another terminal device to log into the information processing apparatus 10. For example, the user in possession of a portable terminal device can log into the information processing apparatus 10 via the server 5.

FIG. 6(*a*) shows the user selection screen. In the information processing system 1, the person who purchased a game basically has the right to start that game. For this reason, the games that can be played may differ between the case where the user A logs in as the primary user and the case where the user B logs in as the primary user. It is thus preferred that the game titles that can be played by the users with their online ID's be displayed on the screen for selecting the primary user who logs in first. For example, on the selection screen shown in FIG. 6(*a*), the icons of the game titles that can be played may be displayed in association with the online ID's. As another example, it may be arranged so that setting the focus frame onto a given online ID will cause the icon of the game title that can be played with that online ID to be displayed. This arrangement makes it possible to know who should be the primary user when a particular game is desired to be played by multiple users.

In connection with the embodiment, it was explained that the login user storage unit 120 stores the information associating a given login user with the primary user, secondary user, or guest user. Through the use of this user attribute information, the login users when displayed in list form may have their online ID's associated with information indicative of each user as the primary user, secondary user, or guest user for display.

Figure 9:
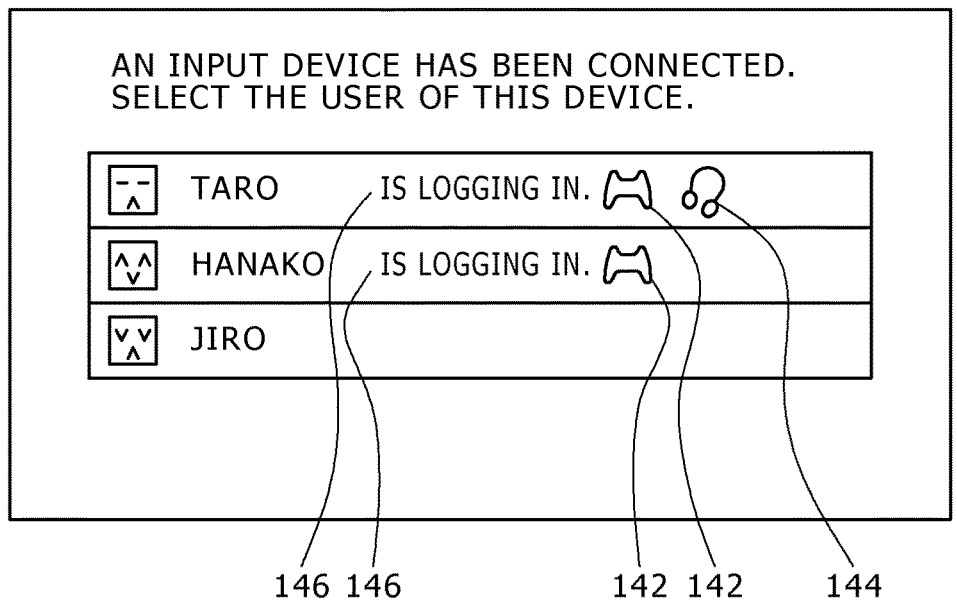
FIG. 9. is an illustration showing another typical selection screen.

FIG. 9 shows another typical selection screen. The selection screen generating unit 104 reads the registered user information held in the registered user information holding unit 130 and generates the selection screen for selecting a user registered in the information processing apparatus 10. In the login user storage unit 120, the device information about the devices for use by login users is stored in association with the login users. The selection screen generating unit 104 reads the login information from the login user storage unit 120. Specifically, the selection screen generating unit 104 reads the information identifying the login users and the device information about the devices used by these login users, and generates a selection screen that displays the information corresponding to each of the registered users.

For example, consider the case where the user A with the online ID "TARO" has logged in and is using multiple input devices 6 (specifically, a game controller and a headset) and where the user B with the online ID "HANAKO" has logged in and is using one input device 6 (specifically, a game controller). As discussed above, the information identifying the devices used by the login users is held in the login user storage unit 120. The selection screen generating unit 104 reads the login information from the login user storage unit 120 to generate the selection screen shown in FIG. 9. On this selection screen, "TARO" is shown associated with information 146 indicating that TARO is currently logging in, with a controller mark 142 indicating that a game controller is in use, and with a headset mark 144 indicating that a headset is in use. Also on this selection screen, "HANAKO" is shown associated with the information 146 indicating that HANAKO is currently logging in and with the controller mark 142 indicating that a game controller is in use. The controller mark 142 and headset mark 144 are prepared beforehand with regard to each device type. These types of information may be given in the form of images as shown in FIG. 9, or in text form. In any case, these marks may be presented in any suitable manner as long as they permit the users to recognize the devices in use.

In this manner, upon display of registered users on the selection screen, if any one of them has logged in, the selection screen generating unit 104 should preferably display the information identifying the devices (e.g., controller mark 142 and headset mark 144) used by the registered login user in association with that user. It was also explained above that the selection screen generating unit 104 may reference the device information included in a connection request from a given device and exclude the login user who uses that device from the registered user list. Alternatively, where the information identifying the devices used by login users is displayed as shown in FIG. 9, the login users may be arranged not to be excluded from the registered user list.

Where the information about login users is to be displayed by means other than the selection screen, the information (marks) identifying the devices used by the login users may be displayed in association with these users.

REFERENCE SIGNS LIST

1 . . . Information processing system, 4 . . . Output device, 5 . . . Server, 6 . . . Input device, . . . Information processing apparatus, 60 . . . Main system, 90 . . . Communication unit, 92 . . . Input receiving unit, 94 . Application startup unit, 100 . . . Login controller, 102 . . . Initial registration unit, 104 . . . Selection screen generating unit, 106 . . . Login authentication unit, 108 . . . Link processing unit, 110 . . . Guest account granting unit, 112 . . . Message display unit, 114 . . . Sign-in processing unit, 116 . . . Logoff management unit, 120 . . . Login user storage unit, 130 . . . Registered user information holding unit, 132 . . . State management unit, 140 . . . Skip area.

INDUSTRIAL APPLICABILITY

The present invention may be utilized in the field of information processing technologies for managing the login of users.

The invention claimed is:

1. An information processing apparatus comprising:
a registered user information holding unit configured to hold user information about users registered in the information processing apparatus;
a communication unit which, upon receipt of a connection request from a device, is configured to connect the device with the information processing apparatus;
a login controller which, upon receipt by the communication unit of the connection request from the device, is configured to determine whether or not to allow a user to log in through the use of the user information held in the registered user information holding unit; and
an application startup unit configured to start an application,
wherein the login controller includes a storage unit configured to store information identifying a plurality of users, one of which who logged in before another user, such one being a primary user and the other user being a secondary user who logged in while the primary user was logged in, and
the application startup unit, upon receipt of a start instruction from the device used by the primary user, starts the application, because the primary user logged in before the secondary user, and
the application startup unit, upon receipt of a start instruction from the device used by the secondary user, does not start the application, because the secondary user logged in after the primary user, and
the secondary user, when logged in after the primary user and while the application has not been started, is permitted to delete saved data of the application.

2. The information processing apparatus according to claim 1, wherein the storage unit stores the information identifying the users who have logged in in association with device information about the devices used by the users.

3. The information processing apparatus according to claim 1, wherein the storage unit stores the information identifying the primary user in association with information indicating initial login.

4. The information processing apparatus according to claim 1, further comprising:
a state management unit configured to manage a system operating state of the information processing apparatus, wherein, upon receipt of a logoff request from a user, the login controller allows the user to log off, and
wherein the state management unit sets the system operating state to a standby state when the login controller allows the primary user to log off, the state management unit having the system operating state unchanged when the login controller allows the secondary user to log off.

5. The information processing apparatus according to claim 1, wherein the login controller provides a selection screen for selecting a registered user but excludes from the selection screen the users having already logged in.

6. A computer including a microprocessor executing a program for causing the computer to execute actions, comprising:
connecting a device with the computer upon receipt of a connection request from the device;
determining whether or not to allow a user to log in by use of user information held in a holding unit holding the user information about the users registered in the computer upon receipt of the connection request from the device;
storing information identifying a plurality of users, one of which who logged in before an other user, such one being a primary user and the other user being a secondary user who logged in while the primary user was logged in; and
starting an application,
wherein the starting application, upon receipt of a start instruction from the device used by the primary user, starts the application, because the primary user logged in before the secondary user, and
wherein the starting application, upon receipt of a start instruction from the device used by the secondary user, does not start the application, because the secondary user logged in after the primary user, and
the secondary user, when logged in after the primary user and while the application has not been started, is permitted to delete saved data of the application.

7. A non-transitory recording medium which stores a program for a computer and is readable by the computer, the program for causing the computer to carry out actions, including:
- connecting a device with the computer upon receipt of a connection request from the device;
- determining whether or not to allow a user to log in by use of user information held in a holding unit holding the user information about the users registered in the computer upon receipt of the connection request from the device;
- storing information identifying a plurality of users, one of which who logged in before an other user, such one being a primary user and the other user being a secondary user who logged in while the primary user was logged in; and
- starting an application,
- wherein the starting application, upon receipt of a start instruction from the device used by the primary user, starts the application, because the primary user logged in before the secondary user, and
- wherein the starting application, upon receipt of a start instruction from the device used by the secondary user, does not start the application, because the secondary user logged in after the primary user, and
- the secondary user, when logged in after the primary user and while the application has not been started, is permitted to delete saved data of the application.

8. An information processing apparatus comprising:
- a registered user information holding unit configured to hold user information about users registered each with a respective local account in the information processing apparatus;
- a communication unit which, upon receipt of a connection request from a device, is configured to connect the device with the information processing apparatus; and
- a login controller configured to determine whether or not to allow a user to log in to one of the local accounts in the information processing device, wherein the login controller includes:
- a selection screen generating unit which, upon receipt by the communication unit of the connection request from the device, is configured to provide a selection screen including a user list on which to perform a selecting operation to select a user registered with one of the local accounts in the information processing apparatus,
- a login authentication unit configured to allow a user to log in to one of the local accounts in the information processing apparatus by identifying a local account of the user who performed the selecting operation on the user list, through authentication by use of the user information held in the registered user information holding unit with respect to the user, and
- an account granting unit configured to grant, while none of the registered users are logged in, to a guest user, the guest user being a user not registered with a local account in the information processing apparatus but registered with a network account in a network service providing services to users of the information processing apparatus, a temporary local account in the information processing apparatus, wherein
- the login authentication unit allows the guest user to log in to the temporary local account upon authentication of the guest user to the network account of the guest user.

9. The information processing apparatus according to claim 8, wherein data saved by the guest user is not recorded.

10. The information processing apparatus according to claim 8, wherein the login controller includes a message display unit configured to display a predetermined message when the guest user who is granted the temporary account is allowed to log in.

11. The information processing apparatus according to claim 8, wherein
- the login controller includes a storage unit configured to store information identifying the registered users having registered accounts and information identifying the guest user who is granted the temporary account, and
- the storage unit stores the guest user who is granted the temporary account in association with information identifying an unregistered user.

12. The information processing apparatus according to claim 8, wherein
- the selection screen generating unit provides a selection screen including a skip area for a user to skip the selecting operation, and
- the account granting unit grants the temporary account to the user who selected the skip area.

13. A computer including a microprocessor executing a program for causing the computer to execute actions, comprising:
- holding in a holding unit user information about users registered each with a respective local account in the computer;
- connecting a device with the computer upon receipt of a connection request from the device;
- providing a selection screen including a user list on which to perform a selecting operation to select a user registered with one of the local accounts in the computer;
- allowing a user to log in to one of the local accounts in the computer by identifying a local account of the user who performed the selecting operation on the user list, through authentication by use of the user information held in the holding unit with respect to the user;
- allowing a guest user who is an unregistered user to log in by granting, while none of the registered users are logged in, to a guest user, the guest user being a user not registered with a local account in the computer but registered with a network account in a network service providing services to users of the computer, a temporary local account in the computer; and
- allowing the guest user to log in to the temporary local account upon authentication of the guest user to the network account of the guest user.

14. A recording medium which stores a program for a computer and is readable by the computer, the program causing the computer to execute actions, including:
- holding in a holding unit user information about users registered each with a respective local account in the computer;
- connecting a device with the computer upon receipt of a connection request from the device;
- providing a selection screen including a user list on which to perform a selecting operation to select a user registered with one of the local accounts in the computer;
- allowing a user to log in to one of the local accounts in the computer by identifying a local account of the user who performed the selecting operation on the user list, through authentication by use of the user information held in the holding unit with respect to the user;

allowing a guest user who is an unregistered user to log in by granting, while none of the registered users are logged in, to a guest user, the guest user being a user not registered with a local account in the computer but registered with a network account in a network service providing services to users of the computer, a temporary local account in the computer; and allowing the guest user to log in to the temporary local account upon authentication of the guest user to the network account of the guest user.

* * * * *